US006877018B2

(12) United States Patent
Oshins et al.

(10) Patent No.: US 6,877,018 B2
(45) Date of Patent: Apr. 5, 2005

(54) SYSTEM AND METHOD FOR UNLOADING NAMESPACE DEVICES

(75) Inventors: Jacob Oshins, Seattle, WA (US); Stephane G. Plante, Kirkland, WA (US); Adrian J. Oney, Woodinville, WA (US); Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 09/895,449

(22) Filed: Jun. 29, 2001

(65) Prior Publication Data

US 2002/0133487 A1 Sep. 19, 2002

Related U.S. Application Data

(60) Provisional application No. 60/276,101, filed on Mar. 15, 2001.

(51) Int. Cl.[7] .............................................. G06F 17/30
(52) U.S. Cl. ...................... 707/206; 707/10; 707/102; 707/200; 707/205
(58) Field of Search .......................... 707/206, 10, 102, 707/200, 205, 8, 100, 103; 709/315; 713/300; 711/141, 118

(56) References Cited

U.S. PATENT DOCUMENTS

| 5,025,367 | A | * | 6/1991 | Gurd et al. ................. 707/206 |
| 5,241,673 | A | * | 8/1993 | Schelvis ................. 707/103 R |
| 5,584,029 | A | * | 12/1996 | Izui et al. .................... 713/300 |
| 5,829,034 | A | * | 10/1998 | Hagersten et al. .......... 711/141 |
| 5,881,311 | A | * | 3/1999 | Woods .......................... 710/4 |
| 6,467,026 | B2 | * | 10/2002 | Yamamoto et al. ......... 711/118 |
| 6,510,435 | B2 | * | 1/2003 | Bayer .......................... 707/100 |
| 6,578,033 | B1 | * | 6/2003 | Singhal et al. ................. 707/8 |
| 6,751,635 | B1 | * | 6/2004 | Chen et al. ................. 707/200 |
| 2003/0033441 | A1 | * | 2/2003 | Forin et al. ................. 709/315 |

OTHER PUBLICATIONS

Sherer et al., "SMALS: a novel database for two–dimensional object location", IEEE, 1990, pp. 57–65.*

* cited by examiner

*Primary Examiner*—Thuy N. Pardo
(74) *Attorney, Agent, or Firm*—Merchant & Gould PC (57) ABSTRACT

An advanced configuration and power management system is described which supports an unload command by identifying those objects that are to be unloaded and, rather than simply attempting to delete the objects, detaches them from the namespace while keeping them in memory in a location accessible by the system. In this way, the system avoids the problem of trying to synchronize accesses to the objects, yet the objects not longer exist in the tree, so namespace collisions are avoided.

31 Claims, 7 Drawing Sheets

SYSTEM AND METHOD FOR UNLOADING NAMESPACE DEVICES

REFERENCE TO RELATED APPLICATION

The present patent application claims priority from U.S. Provisional Patent Application No. 60/276,101, entitled System and Method for Unloading Namespace Devices, filed on Mar. 15, 2001.

BACKGROUND OF THE INVENTION

Power management and control is an important and evolving part of computing technology. Greater demand for computing devices with more functionality and smaller size increases the need for an efficient power management and configuration system. For instance, many computing systems, particularly in smaller, laptop computers, have moved toward hot-pluggable components so that they may be dynamically removed to conserve power and weight when not needed. ACPI (Advanced Configuration and Power Interface) is an emerging industry specification that defines a flexible and extensible interface for power and configuration management. The interface enables and supports power management through improved hardware and operating system coordination. ACPI allows the operating system to control the power states of many hardware components, and to pass information to and from some hardware components, such as the temperature of a thermal sensor or the power remaining in a battery. It should be noted that a computer system may include both hardware components that are designed to interact with an ACPI system and some that are not.

Stated generally, to interact with the ACPI system, hardware components provide a platform-independent description of themselves (termed "ACPI tables") to an ACPI portion of the computer's operating system. At boot time, the ACPI subsystem builds a namespace that describes each of the several ACPI-compliant hardware devices by loading the several ACPI tables. Each ACPI table may include methods that allow the ACPI subsystem or other program modules to interact with the ACPI-compliant hardware devices.

More specifically, the ACPI specification defines two types of ACPI tables that are pertinent to the present discussion: a Differentiated System Description Table (DSDT) and a Secondary System Description Table (SSDT). The DSDT is part of a fixed system description loaded at system boot and it cannot be unloaded. SSDTs are description tables that may be loaded after system boot. There may be multiple SSDTs but there is only one DSDT. The theory is that an OEM can provide base system support in one table (the DSDT) and add smaller system options on an as needed basis in other tables (the SSDTs).

The ACPI specification provides for an Unload function to unload SSDTs that may be loaded, however, existing ACPI implementations have not implemented the Unload function for several reasons. For instance, there has not been a real need to use SSDTs in addition to the DSDT. Creating and loading a DSDT to describe the typical computing system has been sufficient because most computing systems simply don't have components which are routinely removed or that require an ACPI description to be removed from the namespace. In addition, difficult synchronization issues have acted to dissuade ACPI system developers from implementing an unload capability.

Moreover, removing entries from the ACPI namespace creates collision issues with entries that would subsequently be loaded. For mostly that reason, in the few instances where computing components are commonly removed from a computing system (such as undocking a laptop computer), the ACPI objects are simply left in the namespace. If another ACPI table is subsequently loaded in the namespace and has the same name or is configured to support the same device, a collision would occur. Until now, namespace collisions have been avoided by simply loading multiple ACPI descriptions for each alternative type of hardware device that may be present and then not unloading them. The number of alternative hardware devices has, until recently, been small enough that the DSDT can be loaded with each alternative hardware device without a need for SSDTs. Alternatively, the number of SSDTs that may be loaded is small enough that there has not been a need to unload them.

SUMMARY OF THE INVENTION

The present invention overcomes the problems identified above by providing a system and method for unloading objects from the namespace of an advanced configuration and power management system. Briefly stated, a software component, such as an ACPI driver, in accordance with the present invention manages the ACPI namespace. The component supports an Unload command by identifying those objects that are to be unloaded and, rather than simply attempting to delete the objects, detaches them from the namespace while keeping them in memory in a location accessible by the system. Events that may surface through the ACPI subsystem are temporarily suspended during the unload event to avoid synchronization conflicts. In this way, the described system overcomes the problems of trying to synchronize accesses to the objects, yet the objects no longer exist in the tree, so namespace collisions are avoided.

More specifically, the invention provides a method for unloading an object from an advanced configuration and power management system by, in response to an Unload command, disabling general purpose events and flushing various work queues. These tasks put the ACPI subsystem in a steady state. At that point, the ACPI subsystem identifies those ACPI namespace objects to be unloaded, such as from a parameter passed with the Unload command. The ACPI subsystem may, in addition, temporarily terminate access to the ACPI namespace, such as by acquiring a lock on the ACPI namespace. With access to the ACPI namespace suspended, the ACPI subsystem detaches each of the objects from the ACPI namespace while maintaining pointers to the actual locations of the objects in memory. This operation preserves the direct children of the objects to be unloaded, which allows the ACPI subsystem to find any control methods that it thinks belong to the object.

The ACPI subsystem may then mark the detached objects and any associated namespace objects as invalid, which informs various components of the ACPI subsystem that they should not try to execute or evaluate those objects. The ACPI system can then release the lock on the ACPI namespace, resume handling general purpose events, and issue a notification to the kernel that the objects that have been removed from the ACPI namespace. In response to the notification, the kernel may unload any device drivers that were supporting the devices associated with the unloaded objects. When a final device driver has been unloaded, the ACPI subsystem may free any data structures associated with the unloaded objects, including the namespace objects that were detached from the namespace.

There are several advantages to the present invention. For instance, the computer operating system does not have to make the entire unload process synchronous. In other words, in the absence of the present invention, to simply delete a device description from the namespace the ACPI subsystem would have to block until the operating system has stopped using the device. With the invention, the ACPI subsystem still has control of the device descriptions that have only been detached from the namespace but not deleted, which avoids the blocking problem. In addition, the ACPI subsystem may handle an Unload command followed by a Load command without the namespace collision problem identified above because the device description has been removed from the namespace. Moreover, an existing facility, such as an operating system kernel, maintains reference counts on the various devices in the system, then reference counting by the ACPI subsystem is not required.

DETAILED DESCRIPTION OF THE PREFERRED EMBODIMENT

Illustrative Operating Environment

Figure 1:
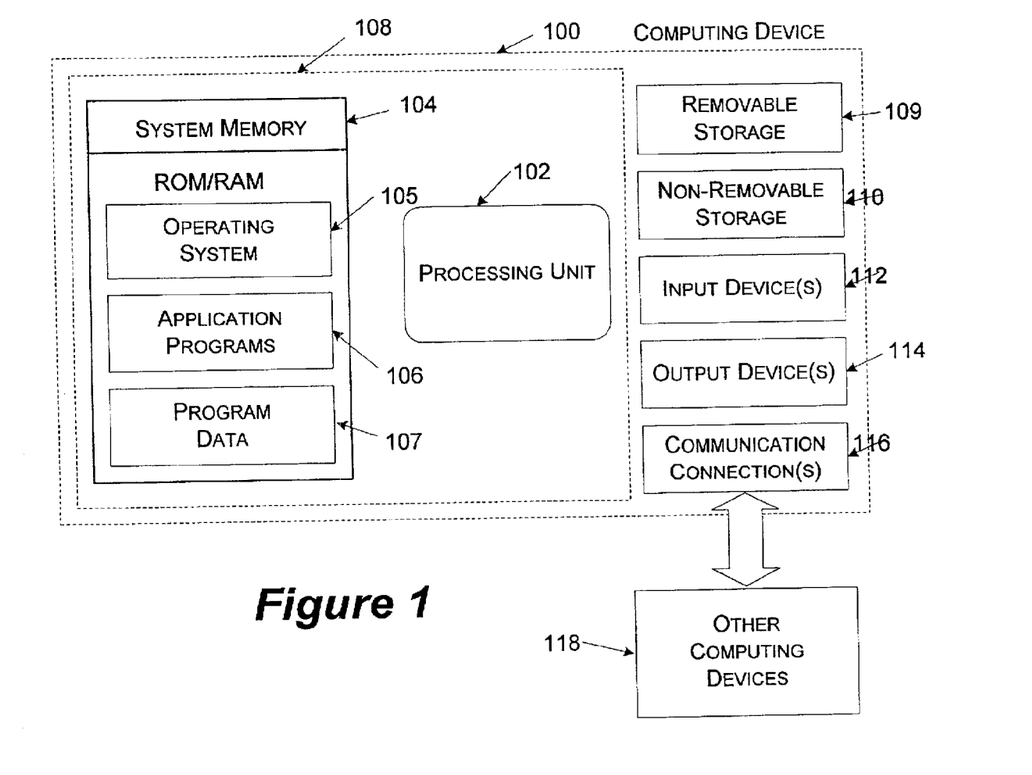
FIG. 1 illustrates an exemplary computing environment which may be adapted to implement one embodiment of the present invention.

With reference to FIG. 1, an exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more application programs 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are well know in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Configuration Management System

Figure 2:
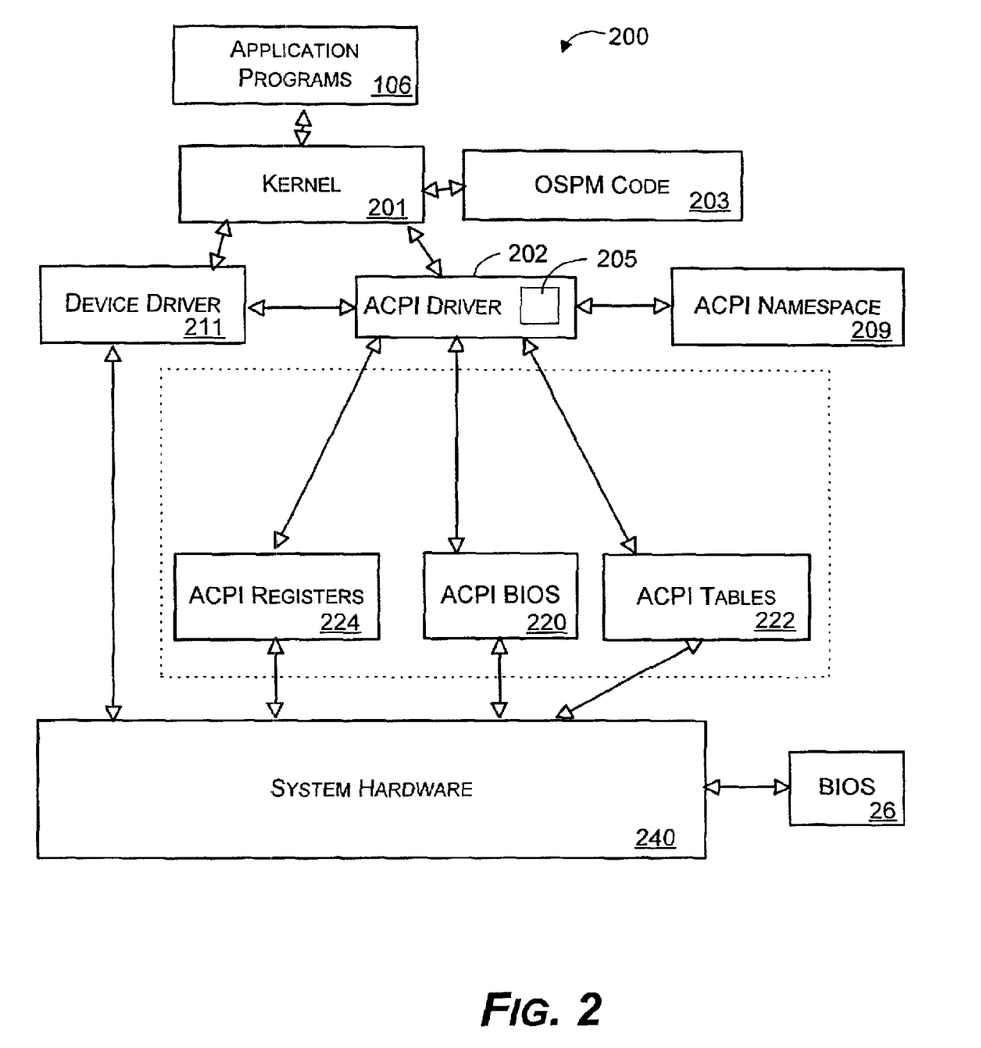
FIG. 2 is a functional block diagram of one exemplary ACPI system as implemented in the computer system shown in FIG. 1.

FIG. 2 is a functional block diagram of an ACPI system 200 as implemented in the computer system 100 of FIG. 1. The ACPI system 200 shown in FIG. 2 generally illustrates a configuration management system that may benefit from the present invention. Although illustrated in FIG. 2 and described here generally, certain components of the ACPI system 200 are shown in greater detail in FIG. 4 together with a detailed discussion of those components and how they implement one embodiment of the present invention. Although the present invention may be described here with reference to the ACPI configuration management system, there is no intention to limit the present invention to ACPI. Rather, the present invention is intended to operate with and provide benefits with any operating system, architecture, and/or configuration management system.

As shown, the application programs 106 may interface with a kernel 201, which is a part of the operating system 105, generally through application programming interface (API) calls or the like. The kernel 201 can be generally considered as one or more software modules that are responsible for performing many operating system functions. One such function is passing information between the application programs 106 and the lower level components of the ACPI system 200, such as the ACPI driver 202 (described below) and various device drivers (e.g., device driver 211).

The kernel 201 interfaces with Operating System Power Management (OSPM) system code 203. The OSPM system code 203 comprises one or more software modules that may be a part of the operating system 105 and that may be used to modify the behavior of certain components of the computer system 100, typically to conserve power in accordance with pre-configured power conservation settings. As is generally known, the various device drivers 211 interface with and generally control the hardware installed in the computer system 100.

The ACPI driver 202 is, generally speaking, a module that controls the functioning of much of the ACPI system 200. The ACPI driver 202 may be supplied as part of the operating system 105 or as a separate component. In the described system, the ACPI driver 202 is loaded during system start-up at the base of a tree of devices where it acts as an interface between the operating system 105 and the ACPI BIOS 220. The ACPI driver 202 is responsible for many tasks, such as initiating and maintaining the ACPI system 200 by populating an ACPI namespace 209 (illustrated in FIG. 3 and described below) at system startup, loading and unloading description blocks from the ACPI namespace at run time, handling certain general purpose events triggered by ACPI hardware, handing off other general purpose events to modules registered to handle those events, and the like.

A driver communicates with other drivers and the operating system components (e.g., an I/O manager or the kernel 201), for example in the Windows® 2000 operating system, by passing messages called I/O request packets (IRPs) up and down a "driver stack." As will be understood by those skilled in the art, drivers for a particular hardware device may be "stacked" such that messages directed either down to the hardware device or back up to the operating system (or other program module) are passed through a chain of drivers in a driver stack before reaching their destination. Applications and systems, such as the ACPI system 200, may insert a driver, such as the ACPI driver 202, in a driver stack to add functionality to the hardware device.

To that end, for each device described in an ACPI namespace 209 (described below), the ACPI driver 202 creates either a filter Device Object (filter DO) or a Physical Device Object (PDO) in the driver stack for that device. If the device is capable of being enumerated by an element of another subsystem, such as a Plug-n-Play subsystem, that element of the other subsystem may create the PDO for the device and the ACPI driver 202 may put a filter DO on top of the PDO. The ACPI system 200 provides power management features to the device stack by means of these device objects. For more information on filter DOs, PDOs and Functional DOs (FDOs), refer to the Microsoft Windows® 2000 Driver Development Kit, publicly available from the Microsoft Corporation of Redmond, Wash.

The ACPI driver 202 makes use of several components when performing the functions of the ACPI system 200. One component is the ACPI BIOS 220, which refers to the portion of system firmware that is compatible with the ACPI specification. Generally stated, the ACPI BIOS 220 is part of the code that boots the machine (similar to the BIOS present in most conventional computer systems) and implements interfaces for power and configuration operations, such as sleep, wake, and some restart operations. The ACPI BIOS 220 contains definition blocks used to construct ACPI Tables 222, as is described in greater detail below. Note that although the BIOS 26 and the ACPI BIOS 220 are illustrated as separate components in FIG. 2, they may be implemented as one component in the computer system 100.

The ACPI Tables 222 include at least one definition block (e.g., a DSDT described later) that contains data, control methods, or both. Each set of data or control methods defines and provides access to a respective hardware device. The definition blocks are written in an interpreted language called ACPI Machine Language (AML), the interpretation of which is performed by an AML interpreter 205. One such definition block, a Differentiated Definition Block (DDB), describes the base computer system. Other definition blocks may be provided to describe additional hardware devices. One ACPI Table 222, known as a Differentiated System Description Table (DSDT) describes the base computer system, that is, the DSDT contains a Differentiated Definition Block (DDB), which describes the root system. The DSDT is like other data blocks, except that it cannot be unloaded.

There may be one or more Secondary System Descriptor Tables (SSDTs), each of which describes hardware components in addition to the base computer system. The ACPI Specification provides that SSDTs may be unloaded, although until now that capability has been unrealized. The tables also include header data structures that contain information about what the block contains, for example, whether it is a Differentiated System Description Table (DSDT) or a Secondary System Descriptor Table (SSDT). Other definition blocks may be provided to describe additional ACPI devices.

Figure 3:
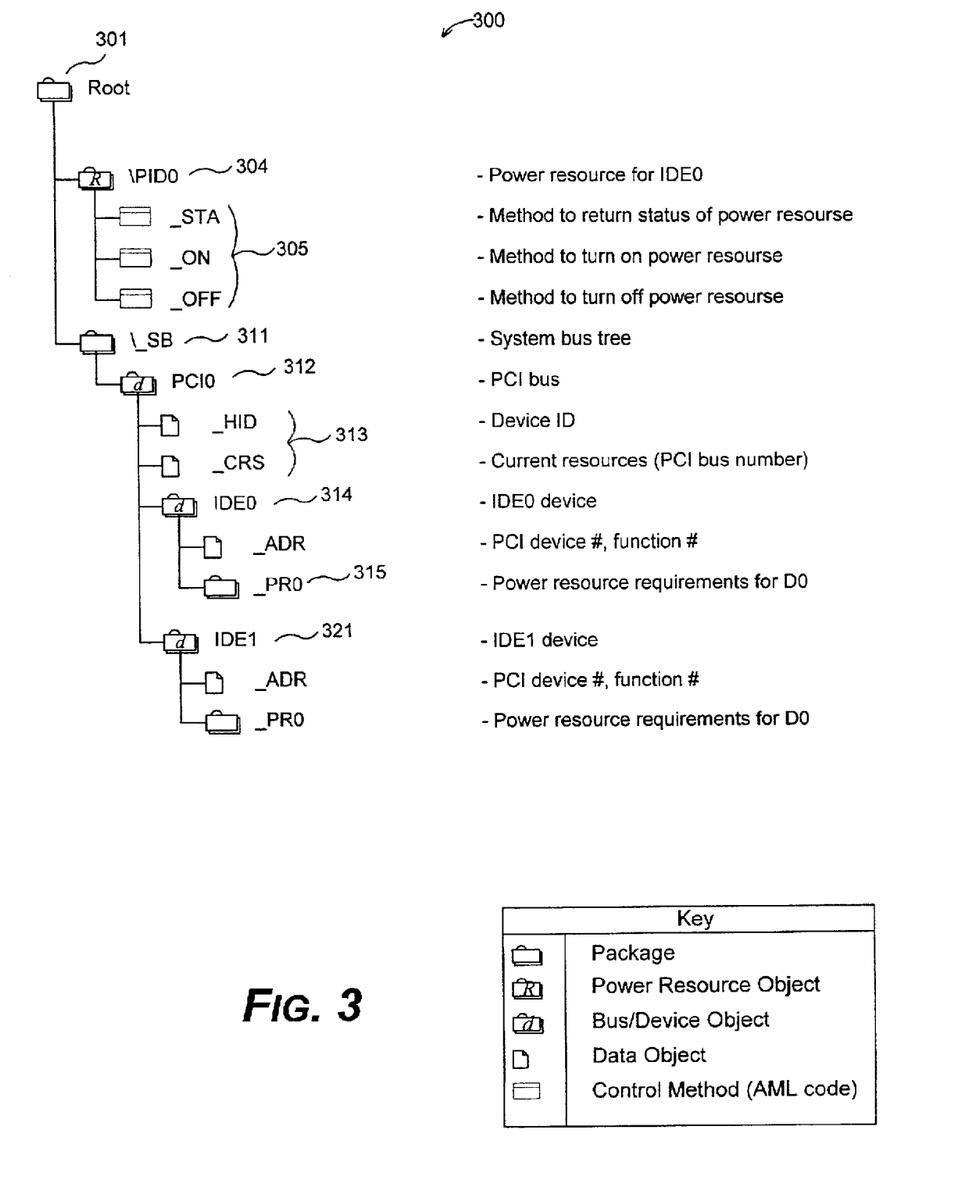
FIG. 3 is a graphical representation of one possible ACPI namespace which essentially represents a working version of the ACPI tables as shown in FIG. 2.

FIG. 3 is a graphical representation of one possible ACPI namespace 209 which essentially represents a working version of the ACPI tables 222. The ACPI Namespace 209 is a hierarchical tree structure in protected memory that contains named objects which describe the ACPI-aware devices installed in the computer system 100. The objects may be data objects, control method objects, bus/device package objects, or the like. As mentioned above, at boot time, the operating system 105 (via the ACPI driver 202) reads the ACPI tables 222 from the ACPI BIOS 220 and loads certain definition blocks (e.g., the DDB) from the ACPI tables 222 to construct the ACPI namespace 209. In accordance with the teachings of the invention, the ACPI driver 202 may dynamically change the contents of the ACPI namespace 209 at run time by loading and/or unloading additional definition blocks from the ACPI Tables 222.

As mentioned, a device in the ACPI namespace 209 may contain control methods. A "control method" is a software module that defines how the ACPI system 200 performs a hardware-related task. For example, the ACPI system 200 may invoke a control method to read the temperature of a thermal zone. Control methods are written in AML, are stored in the definition blocks within the ACPI BIOS 220, and are loaded into the ACPI namespace 209, typically at system boot up. Once in the ACPI namespace 209, the control methods may be invoked by other components in the ACPI system 200, such as device drivers or the like, and are then interpreted and executed by a virtual machine in the AML Interpreter 205. The use and structure of the ACPI namespace, and the objects within, are described in greater detail below with respect to FIG. 3.

The illustrative ACPI namespace 209 shown in FIG. 3 includes a namespace root 301, several illustrative branches under the root 301, and several other objects of various types. For instance, power resource objects, such as power resource object \_PID0 304, may reside under the namespace root 301. The object \PID0 304 may define a power resource for a particular device, such as an on-off switch for an IDE device. The \_SB namespace 311 includes namespace objects that define ACPI-compliant components attached to the system bus. One example of a such namespace object is the PCI bus namespace object 312. Each namespace object may contain other objects, such as data objects 313, control methods, or other namespace objects (e.g., IDE namespace objects IDE0 314 and IDE1 321). Several control methods may be loaded in the ACPI namespace 209 in connection with various objects. For example, control methods related to the status and maintenance of a particular power resource object may be loaded within the scope of the power resource object, such as control methods 305 under the power resource object \PID0 304.

Figure 4:
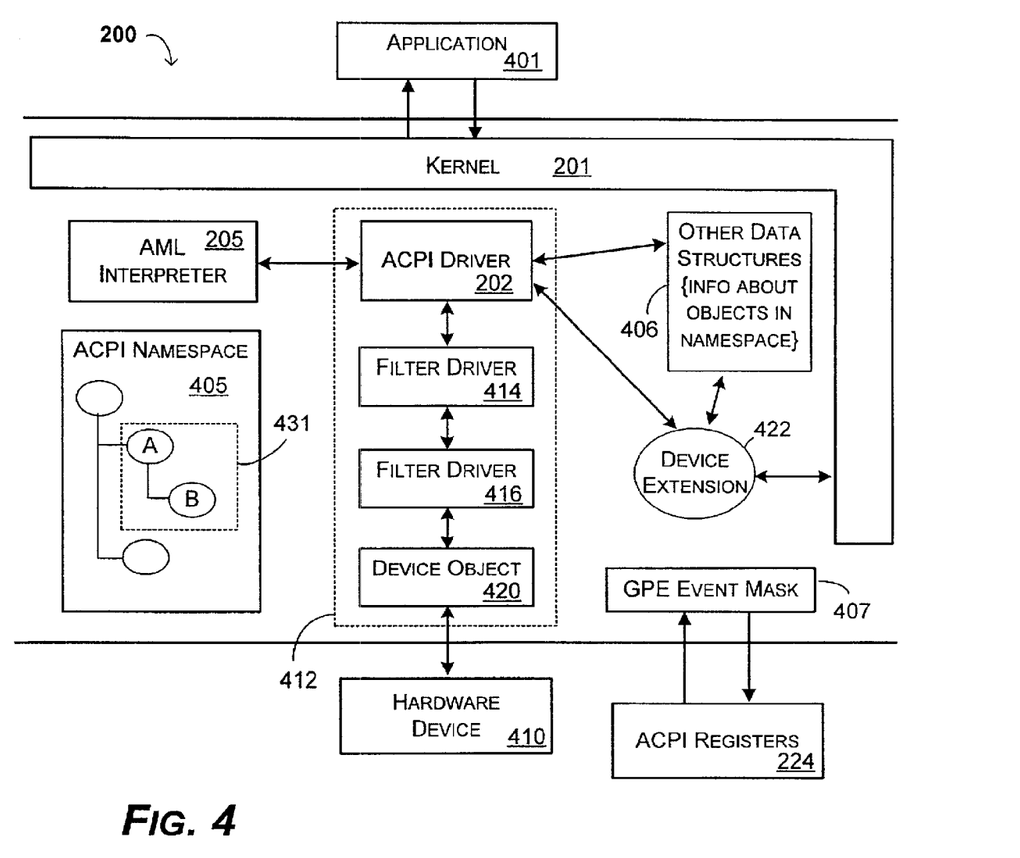
FIG. 4 is a functional block diagram illustrating in greater detail the ACPI system illustrated in FIG. 2, with greater emphasis on certain components as they may implement one embodiment of the present invention.

FIG. 4 is a functional block diagram illustrating in greater detail the ACPI system illustrated in FIG. 2, with greater emphasis on certain components as they may implement one embodiment of the present invention. Several components illustrated in FIG. 4 are similar to those illustrated in FIG. 2 and are shown with similar element numbers for simplicity. For example, the ACPI driver 202, the AML interpreter 205, the ACPI registers 224, and the kernel 201 each exhibit similar functionality to the similarly-identified components illustrated in FIG. 2. A namespace 405 is also illustrated and is similar to the ACPI namespace 209 illustrated in FIG. 2 and FIG. 3. The namespace 405 illustrated in FIG. 4, however, includes simplified objects for illustrative purposes only. The ACPI driver 202 may also maintain other data structures 406 that contain information about the objects in the namespace 405. The other data structures 406 may contain device-specific information for more rapid access by the ACPI driver 202.

Application 401 is shown that may interact with the kernel 201 or other components of the ACPI system 400. Other components of the ACPI system 400 include a GPE event mask 407, which presents to the ACPI system 400 a current state of the ACPI registers 224 so that the ACPI system 400 may identify the existence and the originator of any GPE events raised by ACPI-compliant hardware, such as hardware device 410. The hardware device 410 is accessed by the computing system through the use of a driver stack 412 that includes the ACPI driver 202, a device object 420, and may include filter drivers, such as filter driver 414 and filter driver 416. In this discussion, a device object (sometimes referred to as a Physical Device Object or PDO) is a kernel-mode object, defined by an I/O manager portion of the operating system 105, that represents a physical hardware device. The device object may be created by an underlying bus driver when the physical device is enumerated. Each object in the namespace 405 is associated with a device object, such as device object 420, for the particular hardware device which the namespace object represents. The filter drivers (414, 416) are inserted into the driver stack 412 by other processes and provide additional functionality to the hardware device 410.

A device extension 422 is associated with the ACPI driver 202 and contains information used by the ACPI driver 202, such as at least a pointer to a corresponding device-type object (e.g., object A) and additionally may have pointers to other namespace objects, such as method objects (e.g., object B), associated with that device-type namespace object. In this discussion, a device extension is a data structure associated with a device object that includes context information, such as device state information, spin locks, driver data, and other device-object information. In this embodiment, the device extension 422 includes a reference count field that includes a reference count for each resource that refers to the device object 420, such as the device-type namespace object, any child device extensions, and the like. Preferably, that reference count field is managed by the ACPI driver 202 but is based on a reference count performed by the kernel 201 for each device object enumerated in the system. By making use of the reference counting already performed by the kernel 201, the ACPI system 200 need not reproduce the reference counting that is already being performed. It should be noted that the ACPI driver 202 may also maintain reference counts for its own convenience in addition to any external reference count. The device extension 422 also includes pointers to those resources that refer to the device object 420, including objects in the namespace 405.

The operation of the components is generally described with reference to an example of an unload operation. In this example, an unload event is generated in response to the hardware device 410 either being removed or indicating that it is about to be removed (e.g., a hardware switch or button being pressed). The unload event may be generated by raising a GPE signal in the ACPI registers 224, which is transmitted, via the GPE event mask 407, to the AML interpreter 205 as an instruction to unload the hardware device 410. Alternatively, the unload event may be generated in software, such as by the operating system in response to a user request to remove a piece of hardware or the like. In response to the unload event, the AML interpreter 205 first (prior to actually beginning the unload operation) informs the ACPI driver 202 that an unload operation is about to occur. This pre-notification allows the ACPI driver 202 to do some pre-processing, like disabling system power management and other miscellaneous events.

In addition, the ACPI driver 202 may disable general purpose events from being generated and sent to the AML interpreter 205. Disabling GPE signals at the beginning of the unload operation avoids potential problems that could otherwise occur during the unload operation. For instance, the ACPI driver 202 does not know which hardware device, such as a laptop docking station, is associated with which GPE pins. Thus, if any part of the ACPI namespace 405 is being unloaded, disabling all the GPE pins is the safest way to avoid improperly attempting to service a GPE event for a piece of hardware whose definition is being unloaded. For that reason, the GPE enable pins are cleared at the start of the unload operation so that the GPE mask 407 may be rebuilt at the conclusion of the unload operation.

Next, the AML interpreter 205 informs the ACPI driver 202 which entries in the namespace 405 are disappearing. For example, the unload message may have indicated that the hardware device 410 is being removed or otherwise made unavailable, and the namespace 405 may include one or more objects associated with the hardware device 410. For instance, the objects within box 431 may be associated with the hardware device 410, and as such are identified to the ACPI driver 202. The object labeled "A" may be an ACPI device-type namespace object, and the object labeled "B" may be a control method or other namespace object associated with namespace object "A."

In response to the notice from the AML interpreter 205, the ACPI driver 202 severs any links in its data structures 406 between the disappearing namespace entries (objects 431) and the parents of those disappearing entries. The ACPI driver 202 maintains reference counts in the parent for each child, so the ACPI driver 202 decrements those reference counts as appropriate. The ACPI driver 202 also marks the parent as needing to be updated and indicates to the kernel 201 that the hardware device 410 no longer exists so that the kernel 201 may begin tearing down the driver stack 412 associated with the hardware device 410. It should be noted that the kernel 201 may wait until no running applications or other processes have open handles to the unloaded hardware device before tearing down the driver stack.

Concurrently, the AML interpreter 205 unlinks the disappearing entries (objects 431) from the namespace 405 and marks any control methods (e.g., namespace object "B") associated with the disappearing entries as not executable. If an attempt is made to execute a method marked as not executable, the AML interpreter 205 would either return a failure code or success without actually executing the method. The AML interpreter 205 detaches the disappearing entries from the namespace tree 405 without severing the links between the ACPI devices (e.g., namespace object "A") and their children (e.g., namespace object "B"). Preserving these relationships makes implementation simpler because it allows for certain assumption to remain true, such as caching pointers to certain namespace objects. Moreover, by detaching the entries from the namespace, new entries may be added to the namespace 405 in place of the unloaded entries without fear of a namespace collision.

Once the AML interpreter 205 has completed cutting the disappearing entries from the namespace, it notifies the ACPI driver 202 that the AML interpreter's portion of the unload operation is complete. In response to that notification, the ACPI driver 202 may re-enable any of the support that was disabled at the start of the unload operation. For example, the ACPI driver 202 may rebuild the GPE mask 407 by looking at the GPE Control Methods in the ACPI namespace 405 to calculate a bit mask. The ACPI driver 202 may additionally look at the devices contained in the namespace to see which pins they use for Wake-Support and add those pins to the bit mask.

Figure 5:
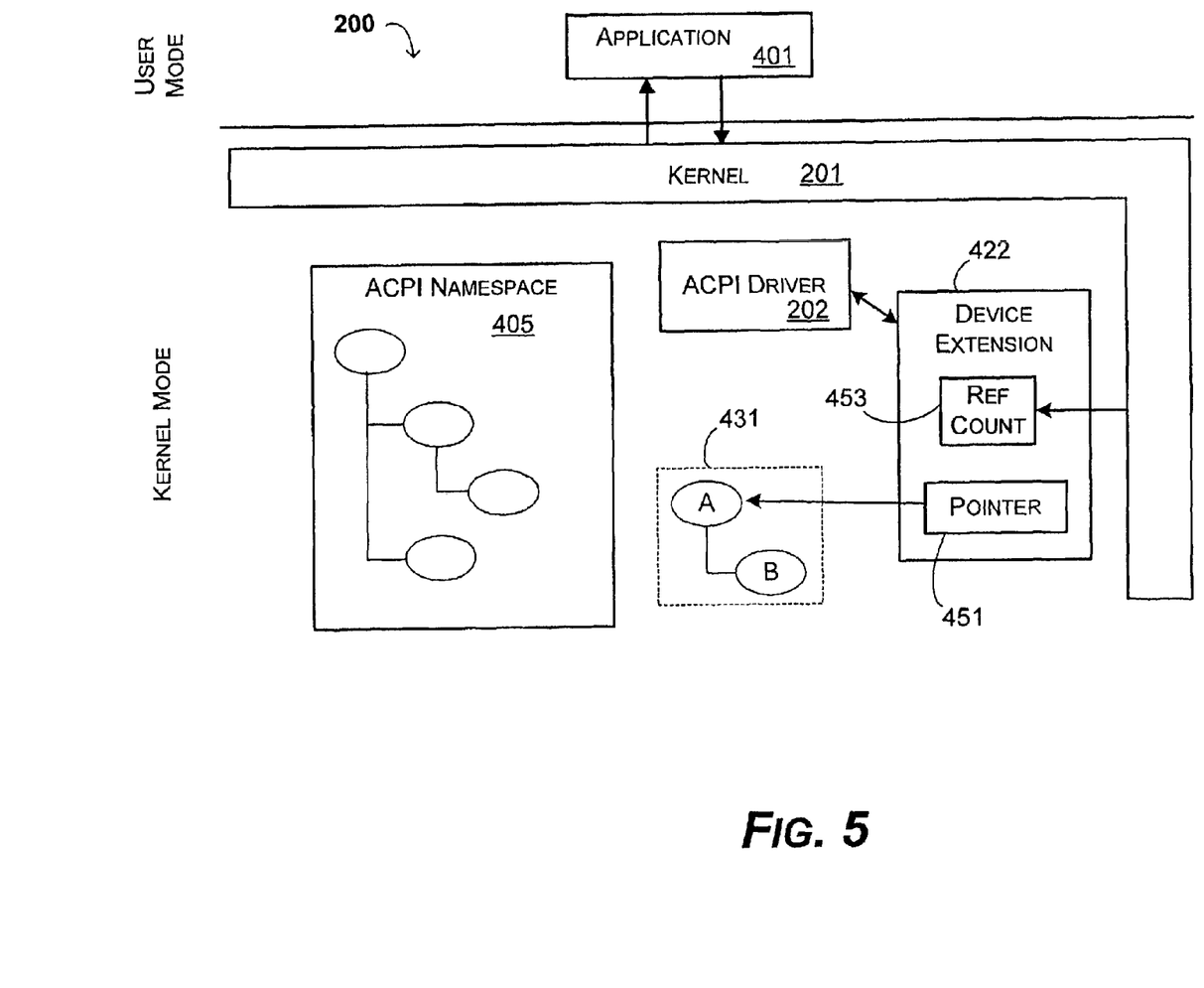
FIG. 5 is a functional block diagram illustrating the ACPI system shown in FIG. 4 after particular objects have been detached from the namespace.

Referring to FIG. 5, there are now a number of objects 431 (including object "A" and object "B") floating in memory that are not attached to the ACPI namespace 405. However, as mentioned above, the device extension 422 associated with the ACPI driver 202 includes a pointer 451 to the ACPI device-type namespace object (i.e., object "A") that has been cut from the namespace 405. For that reason, the operating system 105 and the ACPI driver 202 may still access those objects. In such a case, because any control methods or data structures associated with the objects have been marked as invalid, the accessing entity (e.g., the kernel 201) is notified that the device no longer exists and may respond in a graceful manner, such as with a surprise remove event or the like.

As mentioned above, the ACPI driver 202 keeps track of the resources that point to the device extension 422. The kernel 201 begins deleting those resources and tearing down the driver stack 412 (FIG. 4) when notified by the ACPI driver 202 of the unload operation. As each resource pointing to the device extension 422 is destroyed, the reference count 453 in the device extension 422 is decremented. Thus, the reference count 453 will eventually reflect only a single referring entity, the corresponding namespace object. At that point, the ACPI driver 202 may safely notify the AML interpreter 205 that the namespace objects 431 that were cut are no longer being referenced by any process outside of the ACPI system 200, and it is safe to free the memory associated with the unloaded namespace objects 431. In response, the AML interpreter 205 may destroy the unloaded namespace objects 431 and clean up any memory allocated to them.

If the unloaded objects 431 do not have a corresponding device object, then one of three situations applies: the objects have zero, one, or more than one reference. First, if the data structure has only one reference, then there is not an error and the operations outlined above apply to free the memory. However, zero references or more than one reference indicates a problem with the reference counting. For instance, zero references would not normally be a valid case and would indicate a bug in the driver. More than one reference may indicate to the system that there is an error in the ACPI tables themselves and it will react accordingly. It should be noted that the case where there are two references can occur even if the unloaded objects did not have corresponding device object. The particular case is where an unloaded object has a child device that is not part of the table being unloaded. The operating system treats this case as an error in the ACPI bios.

While the invention has been described thus far with reference to functional block diagrams of software components implementing embodiments of the invention, it may also be described with reference to logical flow diagrams illustrating processes for implementing embodiments of the invention. The logical operations making up the described embodiments of the present invention may be referred to variously as operations, structural devices, acts, or modules. It will be recognized by those skilled in the art that these operations, structural devices, acts, or modules may be implemented in software, in firmware, in special purpose digital logic, or any such combination without deviating from the spirit and scope of the present invention.

Figure 6:
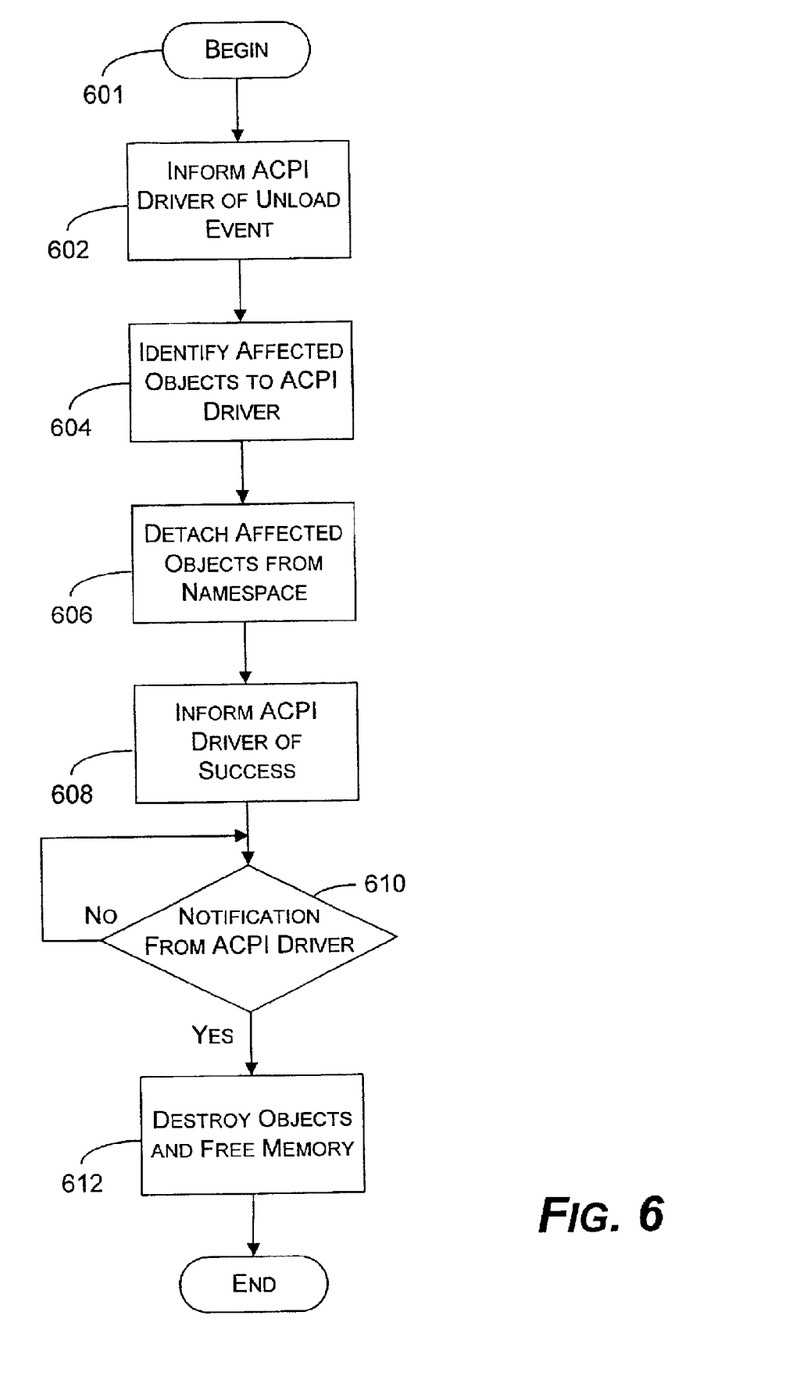
FIG. 6 is a logical flow diagram from the perspective of an AML interpreter generally illustrating a process for unloading a device from an ACPI namespace, in accordance with one embodiment of the present invention.

FIG. 6 is a logical flow diagram from the perspective of the AML interpreter 205 generally illustrating a process 600 for unloading a device from the ACPI namespace 405, in accordance with one embodiment of the present invention. The process 600 begins at block 601, where an unload event has been generated indicating that a hardware device either has disappeared or will shortly disappear. Processing continues at block 602.

At block 602, the AML interpreter 205 informs the ACPI driver 202 that an unload event has been generated. In this embodiment, the ACPI driver 202 is provided notice at the beginning of the unload operation so that the ACPI driver 202 may begin any preprocessing activities that may be helpful or necessary for the unload operation to proceed properly. For example, the ACPI driver 202 may clear the GPE mask 407 and disable the GPE enable pins (within the ACPI registers 224) until the AML interpreter 205 has had time to conduct its portion of the unload operation. In this way, new GPE events will not be created until the unload operation is complete. Other preprocessing activities may also be performed.

At block 604, the AML interpreter 205 identifies the namespace objects which are affected by the unload operation and passes that information to the ACPI driver 202. For instance, the AML interpreter 205 may first acquire a lock on the ACPI namespace 405 and then walk the namespace to build a list of objects within the ACPI namespace 405 that are intended to be unloaded. It should be noted that the ACPI driver 202 is only interested in device-type namespace objects at this point because the linkages are maintained between those objects and their children (e.g., control methods, static values, packages, and the like). The information describing the affected namespace objects is then passed to the ACPI driver 202 to be handled as appropriate (and as described more fully below). The AML interpreter 205 may release the lock it acquired on the ACPI namespace 405 at this point (e.g., when it has finished walking the namespace to build the list).

At block 606, the AML interpreter 205 detaches the affected ACPI namespace objects from the namespace 405. The AML interpreter 205 may walk the namespace 405 and sever any links between the affected objects and their parents. The AML interpreter 205 may set a flag in the affected objects indicating that they are being removed. It may be helpful to note again that the affected device-type namespace objects are detached from their parents, while any children of those objects remain linked. In other words, those namespace objects that may be found in memory through the use of a device extension are severed from their parent, but any children that do not have a corresponding device extension remain linked to their parent so that the ACPI driver 202 continues to have a link to those objects.

At block 608, once the AML interpreter 205 has detached the affected objects from the namespace 405, the AML interpreter 205 informs the ACPI driver 202 of the success and that the unload event is complete. In other words, the AML interpreter 205 indicates to the ACPI driver 202 that the AML interpreter 205 has completed its portion of the unload operation. At that point, the affected ACPI namespace objects remain accessible to the ACPI driver 202 but have been removed from the namespace 405. For that reason, the AML interpreter 205 may reload a new table in the namespace 405 to support a similar hardware device without fear of a collision with the unloaded objects.

At decision block 610, the AML interpreter 610 continues normal processing until a notification that the ACPI driver 202 has completed its portion of the unload operation is received. The AML interpreter 205 may continue to perform routine ACPI functions and operations while awaiting that notification. When the notification is received from the ACPI driver 202, at block 612, the AML interpreter 205 may destroy the affected objects and any associated data structures or the like. It will be appreciated that this notification may happen several times. For instance, the operating system may not unload device drivers in such a way that a single call to free deleted namespace objects is possible. The notification from the ACPI driver 202 indicates that the device corresponding to the affected objects is no longer in use (or referred to by other processes) and the memory may be freed and the process ends at ending block 614.

Figure 7:
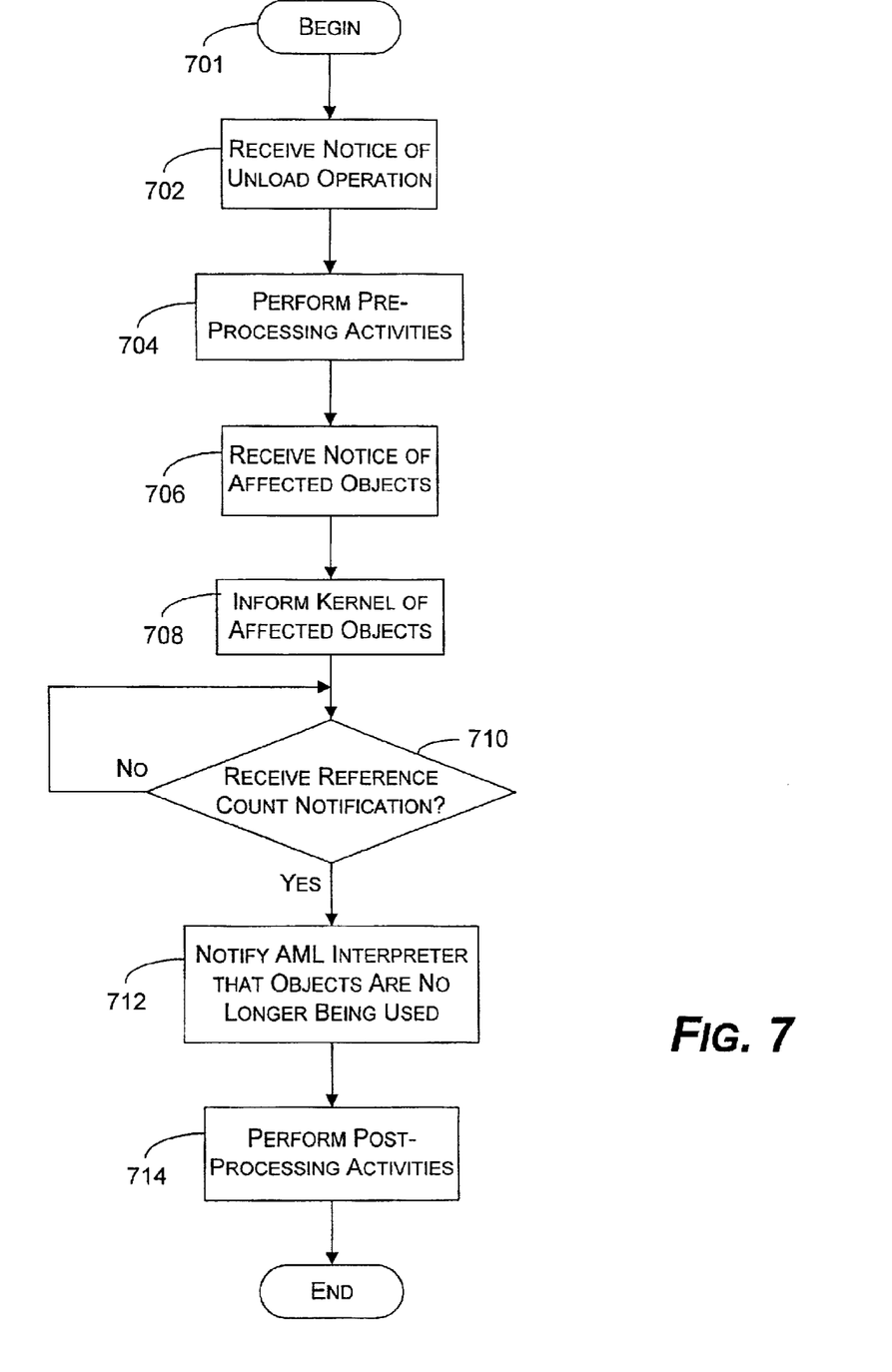
FIG. 7 is a logical flow diagram from the perspective of an ACPI driver generally illustrating a process for unloading a device from an ACPI namespace, in accordance with one embodiment of the present invention.

FIG. 7 is a logical flow diagram from the perspective of the ACPI driver 202 generally illustrating a process 700 for unloading a device from the ACPI namespace 405, in accordance with one embodiment of the present invention. The process 700 begins at block 701 where an unload operation of ACPI components associated with a hardware device has been begun.

At block 702, the ACPI driver 202 receives notification from the AML interpreter 205 that the unload operation has begun. In response to the notification, at block 704, the ACPI driver may perform any preprocessing activity that may be necessary or helpful to the unload operation. In one example, as described above, the ACPI driver 202 may clear the GPE mask 407 and the GPE enable pins until the completion of the unload operation.

At block 706, the ACPI driver 202 receives from the AML interpreter 205 a notification of the affected ACPI namespace objects and the affected hardware devices. In addition, the ACPI driver 202 may set flags in the parent of any affected object indicating that the parent now has invalid relations and should be reevaluated at the conclusion of the unload operation. At block 708, the ACPI driver 202 passes that information to the kernel 201 so that the kernel 201 may begin tearing down any driver stack associated with the hardware device being unloaded.

At decision block 710, the ACPI driver 202 continues processing normally until a notification is received from whatever facility (e.g., the kernel 201) tracks reference counts that the affected namespace objects are no longer in use by any outstanding tasks or processes. In this particular embodiment, a device extension associated with a device object in the driver stack for the hardware device is used to track the reference count. When a reference count within that device extension indicates that the only reference remaining is to the affected namespace objects themselves, then the ACPI driver 202 determines that it is safe to destroy the affected objects and free the memory. If there are more references remaining, the ACPI driver 202 doesn't do anything.

At block 712, the ACPI driver 202 notifies the AML interpreter that the affected objects are no longer in use, indicating that it is safe to destroy the objects and free the memory. The AML interpreter 205 may respond to the notification by doing exactly that, destroying the now-unused objects and freeing the memory. At block 714, once the AML interpreter has informed it of success, the ACPI driver 202 performs any post-processing activities that may be appropriate, such as setting the appropriate GPE enable pins to reactivate the GPE events, and the like.

As can be seen from the above description, implementations of the invention make possible an unload operation of devices from an ACPI namespace. The above specification, together with the attached drawings, provide a complete description of the manufacture and use of the invention. Since many embodiments of the invention can be made without departing from the spirit and scope of the invention, the invention resides in the appended claims.

We claim:

1. A computer-implemented method for removing an object from a namespace, comprising:
   receiving a notification that an unload operation is starting, the unload notification identifying the object to be unloaded from the namespace;
   in response to the unload notification, detaching the identified object from the namespace while maintaining the identified object in a location in memory;
   identifying a device associated with the identified object as invalid;
   informing an operating system component that the device associated with the identified object is invalid; and
   in response to a notification that the associated device is no longer being used, causing the identified object to be freed from the location in memory.

2. The computer-implemented method of claim 1, further comprising:
   prior to detaching the identified object, suspending power management and configuration management activity to put the namespace in a steady state; and
   after the identified object is detached from the namespace, resuming power management and configuration management activity.

3. The computer-implemented method of claim 1, further comprising:
   prior to detaching the identified object, locking access to the namespace; and
   after the identified object is detached from the namespace, unlocking access to the namespace.

4. The computer-implemented method of claim 1, wherein the unload notification indicates that a hardware device associated with the object is being made unavailable.

5. The computer-implemented method of claim 1, wherein the unload notification comprises means for indicating that the hardware device is being made unavailable.

6. The computer-implemented method of claim 5, wherein the means for indicating that the hardware device is being made unavailable comprises an interrupt.

7. The computer-implemented method of claim 6, wherein the interrupt comprises a general purpose event signal.

8. The computer-implemented method of claim 7, wherein the general purpose event signal is generated by the device associated with the identified object.

9. The computer-implemented method of claim 1, wherein detaching the identified object comprises severing a link between the identified object and the namespace and flagging another object in the namespace to indicate that the identified object has been severed.

10. The computer-implemented method of claim 9, wherein maintaining the identified object in a location in memory comprises maintaining a pointer to the location in memory in a device extension associated with the device.

11. The computer-implemented method of claim 1, wherein the notification that the associated device is no longer being used comprises a notification that a reference count associated with the identified object has passed a predetermined threshold.

12. The computer-implemented method of claim 11, wherein the reference count is maintained in a device extension associated with the device, and wherein the predetermined threshold indicates that objects no longer refer to the device.

13. A computer-readable medium having computer-executable instructions for unloading an object from a namespace, comprising:
in response to receiving a notification of an unload operation, identifying the object within the namespace as being unloaded;
detaching the object from the namespace while maintaining the object in a memory location.
informing a driver responsible for coordinating access to the object that the object has been detached from the namespace; and
in response to a notification from the driver that the object is no longer being used, deleting the object from the memory location.

14. The computer-readable medium of claim 13, further comprising:
prior to detaching the object from the namespace, notifying the driver that the unload operation is occurring and identifying the object to the driver.

15. The computer-readable mediuim of claim 13, wherein identifying the object within the namespace as being unloaded comprises setting a flag associated with the object that indicates that the object is being unloaded.

16. The computer-readable medium of claim 15, further comprising setting a second flag associated with a parent object of the object, the second flag indicating that the parent object includes invalid references.

17. The computer-readable medium of claim 13, wherein detaching the object from the namespace comprises severing a link between the object and a parent object of the object.

18. The computer-readable medium of claim 13, further comprising, prior to informing the driver that the object has been detached, modifying the object such that a method associated with the object may not be executed.

19. A computer-readable medium having computer-executable instructions for unloading an object from a namespace, comprising:
receiving a notification that an unload operation of a device is beginning; in response to the notification, performing preprocessing operations to prepare a configuration management system for the unload operation; detaching an object from the namespace while maintaining the object in a memory location;
receiving a notification that the object has been detached from the namespace, the object being associated with the device;
informing an operating system component that the unload operation is beginning and identifying the device;
awaiting a notification that the object is no longer being used by the operating system; and
issuing a notification the configuration management system that the object is no longer being used.

20. The computer-readable medium of claim 19, wherein the preprocessing operations includes invalidating a general purpose event mask associated with the configuration management system.

21. The computer-readable medium of claim 20, wherein the computer-executable instructions further comprise, after receiving the notification that the object is no longer being used by the operating system, rebuilding the general purpose event mask associated with the configuration management system.

22. The computer-readable medium of claim 19, wherein the notification that the object is no longer being used comprises a reference count value associated with a number of resources that refer to a device extension associated with the device.

23. The computer-readable medium of claim 22, wherein the reference count value indicates that only one resource refers to the device extension and the one resource comprises the object being unloaded.

24. The computer-readable medium of claim 19, further comprising:
receiving from the operating system a message intended for the detached object; and
directing the message to the detached object by retrieving a pointer to the detached object from a data structure maintained by the operating system associated with the device.

25. A computer-readable medium having computer-executable components, comprising:
an AML interpreter configured to maintain a namespace of objects associated with hardware devices, and to detach an object from the namespace in response to an unload message, while maintaining the object in a memory location, the object being associated with a device, the AML interpreter being further configured to issue a notification that the object has been detached from the namespace; and
an ACPI driver configured to receive the notification from the AML interpreter and to cause a device object associated with the device to be unloaded, and to issue a notification to the AML interpreter when the device object is successfully unloaded.

26. The computer-readable medium of claim 25, wherein the ACPI driver is further configured to interface with a device extension associated with the device object, the device extension including a reference counter indicative of a number of resources that refer to the device object.

27. The computer-readable medium of claim 26, wherein the ACPI driver is further configured to issue the notification to the AML interpreter in response to the device extension indicating that resources no longer refer to the device object.

28. The computer-readable medium of claim 27, wherein the AML interpreter is further configured to delete the detached object from memory in response to the notification from the ACPI driver.

29. The computer-readable medium of claim 25, wherein the ACPI driver is further configured to direct a message to the detached object.

30. A computer-implemented method for loading a device from a namespace, comprising:
generating an unload event, wherein the unload event indicates that the device is to be removed from the namespace;

informing a driver that the unload event has been generated;

identifying a namespace object affected by the unload event, wherein the namespace object is associated with the device;

sending the identified namespace object to the driver;

detaching the identified namespace object from the namespace while maintaining the identified object in a memory location;

informing the driver that the unload event has been completed; and eliminating the identified namespace object from the memory location.

31. A computer-implemented method for unloading a device from a namespace, comprising:

initiating an unload event, wherein the unload event indicates that the device is to be removed from the namespace;

receiving a notification that the unload event has been initiated;

identifying a namespace object affected by the unload event, wherein the namespace object is associated with the device;

removing the identified namespace object from the namespace;

storing the identified namespace object in a memory location; and notifying an interpreter that the identified namespace object has been removed from the namespace.

* * * * *